United States Patent [19]
Tsujimoto et al.

[11] Patent Number: 5,374,470
[45] Date of Patent: Dec. 20, 1994

[54] SUPPORT FOR PHOTOGRAPHIC PHOTOSENSITIVE MATERIALS HAVING A MAGNETIC RECORDING LAYER, A FIRST CELLULOSE ACETATE LAYER AND A SECOND CELLULOSE ACETATE LAYER INTERMEDIATE THE MAGNETIC LAYER AND FIRST CELLULOSE ACETATE LAYER

[75] Inventors: Tadahiro Tsujimoto; Yoshio Sakakibara; Morio Hashimoto, all of Kanagawa, Japan

[73] Assignee: Fuji Photo Film Co., Ltd., Kanagawa, Japan

[21] Appl. No.: 953,872

[22] Filed: Sep. 30, 1992

[30] Foreign Application Priority Data

Oct. 1, 1991 [JP] Japan .................................. 3-253206

[51] Int. Cl.$^5$ .............................................. G11B 5/00
[52] U.S. Cl. .................................... 428/212; 427/129; 430/140; 428/43; 428/532; 428/534; 428/694 B; 428/694 BS; 428/694 SL; 428/900; 521/40.5
[58] Field of Search ............. 428/43, 532, 534, 694 B, 428/695 BS, 694 SL, 212, 900; 521/40, 44.5, 47, 48; 430/140; 427/129

[56] References Cited

U.S. PATENT DOCUMENTS

| | | | |
|---|---|---|---|
| 2,284,142 | 5/1942 | Gray | 521/44.5 |
| 2,883,301 | 8/1955 | Prichard et al. | 428/532 |
| 4,874,633 | 10/1989 | Komatsu et al. | 427/48 |
| 5,198,471 | 3/1993 | Nauman et al. | 521/46.5 |

*Primary Examiner*—Stevan A. Resan
*Attorney, Agent, or Firm*—Sughrue, Mion, Zinn, Macpeak & Seas

[57] ABSTRACT

A support for photographic photosensitive materials which consists essentially of a magnetic recording layer, a cellulose ester layer and an intermediate layer provided between the magnetic recording layer and the cellulose ester layer consisting essentially of a polymer of which the solubility in a solvent for separation is different from the cellulose ester of the cellulose ester layer. According to the support of the invention, the magnetic recording layer is very easily separated from the cellulose ester layer, and they can easily be recycled. Moreover, magnetic properties of the support are improved.

15 Claims, 2 Drawing Sheets

SUPPORT FOR PHOTOGRAPHIC PHOTOSENSITIVE MATERIALS HAVING A MAGNETIC RECORDING LAYER, A FIRST CELLULOSE ACETATE LAYER AND A SECOND CELLULOSE ACETATE LAYER INTERMEDIATE THE MAGNETIC LAYER AND FIRST CELLULOSE ACETATE LAYER

BACKGROUND OF THE INVENTION

This invention relates to a support for photographic photosensitive materials and a process for producing the same, and more particularly, relates to a support for photographic photosensitive materials and a process for producing the same wherein magnetic recording characteristics and/or separability are improved.

Recently, as disclosed in International Publication Nos. WO 90/04205, WO 90/04212 of PCT applications, etc., silver halide photographic photosensitive material (hereinafter simply referred to as photosensitive material) has been provided with a magnetic recording layer. Photographic conditions, such as photographed date, weather and contraction/enlargement ratio, developing and printing conditions, such as the number of reprints, zooming portion and messages can be inputted into the photosensitive material by inputting magnetic recording signals into the magnetic recording layer in a camera or a processing laboratory. Besides, output to image apparatuses such as television and video tape recorder has been possible.

It is also known to a photosensitive material provided with a magnetic recording layer as to automation in manufacturing or finishing processes of the photosensitive material. Yet example, Japanese Patent KOKAI No. 59-203670 discloses a method of inputting photographic emulsion coating conditions into a transparent magnetic recording layer provided into a support of a photographic material and conducting the attachment, detachment or the like of a coater head automatically by reading the coating conditions in a photographic emulsion coating process. Japanese Patent KOKAI No. 60-45248 discloses a method of adding a transparent magnetic recording layer to a COVET sheet and a photosensitive sheet of a mona-sheet type instant photographic photosensitive material and automating to make a suitable combination of the cover sheet with the photosensitive sheet in a collating process. An example of the support for photographic photosensitive materials provided with the magnetic recording layer in, as shown in FIG. 4, composed of a cellulose ester layer 30 onto which a magnetic recording layer 10 is coated.

As the method of adding a magnetic recording layer to a photosensitive material, it is known a method of forming a transparent magnetic recording layer over the whole surface of the photosensitive material (hereinafter referred to as whole surface coating method) which is disclosed in Japanese Patent KOKAI Nos. 50-16161 and 53-10960, Japanese Patent KOKOKU No. 57-6576 and U.S. Pat. No. 3,782,947 and a method of forming a stripe-formed magnetic recording layer on the outside of photographing portions (hereinafter referred to as stripe coating method) which is disclosed in Japanese Patent KOKAI Nos. 50-138037 and 49-42343.

The whole surface laminating method is simpler than the stripe laminating method in the laminating process. However, since the magnetic recording layer is also formed in photographing portions, it induces adverse affects, such as decrease of photosensitivity due to The absorption by the magnetic recording material and degradation of photographic properties by haze. Accordingly, in order to inhibit these adverse affects, it is necessary to render the content of the magnetic recording material as small as possible. However, when The content of the magnetic recording material is reduced, magnetic output properties are degraded.

On the other hand, in the stripe laminating method, since the magnetic recording layer is provided on the outside of photographing portions, there is only a small space for placing the magnetic recording layer because perforations are formed on both outsides of the photographing portion according to the present format of 135 type photographic film. Thereupon, the aforementioned PCT applications propose to form perforations on one side alone, but, even in this case, the space capable of placing the magnetic recording layer is still small. In order to impart a maxiumum record density to the very narrow space, it is necessary to form a magnetic recording layer uniform in the width direction. This is particularly necessary in the case that a homogeneous multichannel head is used to obtain an input/output capacity without dispersion through each head with utilizing the magnetic recording layer from one end to the other in the width direction. The stripe formed magnetic recording layer is usually formed by coating, and there are problems that the thickness of the stripe layer varies at both end portions, that it is difficult to form in rectangle to set the width and the thickness independently and that the coating width is broadened. As a results, a uniform input/output capacity cannot be obtained in the case of using a multichannel head. This matter is caused not only by the difference in the amount of the magnetic recording material in the track of each head but also by the influence of space loss due to the formation of gap between the head and the magnetic recording layer. Particularly, the space loss sharply increases by increasing magnetic record density.

Besides, when a film with a stripe coating is wound into a big roll or in a film cartridges problems occur, such as adhesion of the stripe layer to the emulsion layer, weaving or loosening or collapse of the corner of the stripe layer.

Incidentally, in view of global environment, i.e. to reduce wastes as little as possible, and moreover, in view of the reduction in the manufacturing cost of photosensitive materials, the importance of the utilization of the photosensitive materials as regenerated raw materials has been increasing remarkably. Examples of the photosensitive materials are cut wastes produced by edge trim in the support production process and cut wastes produced by perforation in a finishing process after coating photographic emulsion. In the case of the wastes coated with photographic emulsion, emulsion layer is separated from support, and useful materials such as silver halide are separated therefrom. They are purified and then used again. It is common that the support is also purified and used again as a raw material.

However, it is very difficult to recycle the photosensitive materials containing a magnetic recording layer. That is, in the case of the magnetic recording layers laminated by coating disclosed in Japanese Patent KOKAI Nos. 50-16161 and 60-45248, since they are firmly adhered to cellulose acetate layer, it is not easy to separate the magnetic recording layer from the cellulose acetate layer. Furthermore, in the case of the magnetic recording layer formed by co-casting as disclosed in Japanese Patent KOKAI No. 57-6576, since it is strongly joined to the cellulose acetate layer which is the main body of the support, it is not easy to separate the magnetic recording layer from the cellulose acetate layer.

As mentioned above, conventional supports for photosensitive materials have a problem that it is not easy to separate the magnetic recording layer from the cellulose acetate layer, irrespective of providing the magnetic recording layer by coating or co-casting, and regeneration of the support portion is difficult. This matter also induces a problem of increasing wastes and of increasing manufacturing cost of the photosensitive material.

SUMMARY OF THE INVENTION

An object of the invention is to provide a support for photographic photosensitive materials containing a magnetic recording layer of which magnetic properties are improved and a process for producing the same.

Another object of the invention is to provide a support for photographic photosensitive materials which can be regenerated by facilitating the separation of the magnetic recording layer from a cellulose ester layer and a process for producing the same.

The above objects have been achieved by a support for photographic phocosensitive materials which consists essentially of a magnetic recording layers a cellulose ester layer and an intermediate layer provided between the magnetic recording layer and the cellulose ester layer consisting essentially of a polymer of which the solubility in a solvent for separation is different from the cellulose ester of the cellulose ester layer and a process for producing the same.

The above objects have also been achieved by a process for producing a support for photographic photosensitive materials consisting essentially of a magnetic recording layer, an intermediate layer and a cellulose ester layer laminated in this order which comprises casting a dope for the magnetic recording layer, a dope for the intermediate layer and a dope for the cellulose ester layer, said dope for the intermediate layer having a smaller polymer/solvent ratio than the dope for the magnetic recording layer, and said dope for the intermediate layer casting so as to contact the dope for the magnetic recording layer.

DETAILED DESCRIPTION OF THE INVENTION

Figure 1:
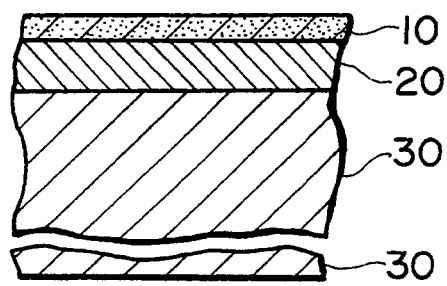
FIG. 1 is a partially sectional view of a support for photographic photosensitive materials embodying the invention.

As the cellulose esters for forming the cellulose ester layer, there are cellulose acetate, cellulose propionate, cellulose acetate propionate, cellulose butyrate, cellulose acetate bytyrate and the like. Among them, cellulose acetate is preferred, and cellulose acetane having an acetylation degree of 56 to 62% is particularly preferred.

Although the thickness of the cellulose ester layer is not limited, a preferable range is 50 to 300 μm.

The cellulose ester layer is formed by casting a dope for the cellulose ester layer. The dope for the cellulose ester layer is mainly composed of the above cellulose ester and an organic solvent. Suitable organic solvents include methylene chloride, chloroform, tetrachloroethylene, dimethylacetamide, etc. When cellulose acetate is used as the cellulose ester, a suitable cellulose acetate content of the dope is 3 to 50 wt. %, and 8 to 27 wt. % is preferable.

A plasticizer may be added to the cellulose acetate layer for the improvement in the flexibility or moisture resistance of film. As the plasticizer, there are triphenyl phosphate, biphenyldiphenyl phosphate, diethyl phthalate, dibutyl phthalate, dioctylphthalate, ethyl phthalyl ethyl glycolate, methyl phthalyl ethyl glycolate, trimethyl trimellitate ester, etc. The blending amount of the plasticizer is determined so as not to degrade flexibility, and a suitable range is 2 to 20 wt. % preferably 2 to 15 wt. %.

To the cellulose ester layer, various dyes, ultraviolet absorber, infrared absorber or the like or a combination thereof may be added for the purpose of the prevention of edge-lighting, optical filter or so on. The blending amount is determined according to the purpose of use.

The intermediate layer is formed of a polymer of which the solubility in a solvent for separation (the solvent used at the time of separating the cellulose ester layer from the magnetic recording layer) is different from the cellulose ester of the cellulose ester layer. The polymer of the intermediate layer is determined according to the solvent for separation, and suitable polymers include cellulose acetate, cellulose propionate, cellulose acetate propionate, cellulose butyrate, cellulose acetate butyrate, polyamide, polycarbonate, polysulfone, polyether sulfone, polyarylate and polyphenylene oxide. These polymers may be blended. When the cellulose ester of the cellulose ester layer is cellulose acetate, preferable polymers are a preferable polymer is the same cellulose ester as that of the cellulose ester layer, i.e. cellulose acetate.

And, specifically, in order to get better separability, the cellulose acetate having lower acetyletlon degree than that of the cellulose ester layer is preferable. The molecular weight of the polymer is more than 10,000, and usually, 20,000 to 800,000.

Although the thickness of the intermediate layer is not limited, a preferable range is 0.2 to 10 μm.

The intermediate layer is formed by casting a dope for the intermediate layer. The dope for the intermediate layer is mainly composed of the above polymer and an organic solvent. Although suitable organic solvents are different according to each polymer, they are necessary to have affinity so that phase separation and white turbility do not occur. Examples of the organic solvent are methylene chloride, chloroform, tetrachloroethylene dimethylacetamide, acetone, methyl ethyl ketone, methanol, ethanol, etc., and acetone, methyl ethyl ketone, methanol and ethanol are preferred. A particularly preferable organic solvent is a mixture of acetone and methanol. A suitable polymer content of the dope for the intermediate layer is 3 to 50 wt. %, and 8 to 27 wt. % is preferable.

The aforementioned various additives such as plasticizer may be added to the dope for the intermediate layer.

The magnetic recording layer is mainly formed of a magnetic recording material and a polymer. As the magnetic recording martial, there are, for example, magnetic iron oxide fine powders, Co-containing ferromagnetic iron oxide fine powders, ferromagnetic iron oxide fine powders, ferromagnetic chromium dioxide fine powders barium ferrite and ferromagnetic alloy fine powders. The ferromagnetic alloy fine powders include those of which metal component is more than 75 wt. %. More than 80 wt. % of the metal component is at least one kind of ferromagnetic metals or alloys (Fe, Co, Ni, Fe-Co, Fe-Ni, Co-Ni, Co-Fe-Ni, etc.), and less than 20 wt. % of the metal component is the other component (A1, Si, S, Se, Ti, V, Cr, Mn, Cu, Zn, Y, Mo, Rh, Pd, Ag, Sn, Sb, B, Ba, Ta, W. Re, Au, Hg, Pb, P, La, Ce, Pr, Nd, Te, Bi, etc). The above ferromagnetic metal component may contain a small amount of water, hydroxides or oxides. The preparation of the above ferromagnetic powders are known, and the ferromagnetic powder produced according to the known method can be used in the invention.

A suitable content of the magnetic recording material is 0.01 to 10 $g/m^2$, preferably 0.01 to 0.2 $g/m^2$.

Size, form, crystalline size, specific surface area, etc. of the magnetic recording material are not specific, and various ones may be used. As the form, there are needles, grains, spheres, cubes and places. Surface treatment of the ferromagnetic powder is also not limited. For example, the surface may be treated with a material containing Ti, Si, A1 or the like, or may be treated with an organic compound such as carboxylic acid, sulfonic acid, sulfate ester, phosphoric acid, phosphate ester or an adsorptive compound having a nitrogen-containing heterocycle, e.g. benzotriazole. A suitable pH is in the range of 5 to 10.

In the case of ferromagnetic from oxide fine powders, they are not limited by ferrous/ferric ratio.

The polymer of the magnetic recording layer may be the same as the intermediate layer.

Although the thickness of the magnetic recording layer is not limited, a suitable thickness is less than 15 $\mu$m, usually 0.1 to 15 $\mu$m, and 0.3 to 10 $\mu$m in preferred.

The magnetic recording layer is formed by casting a dope for the magnetic recording layer. The dope for the magentic recording layer is mainly composed of the above magnetic recording material, the above polymer and an organic solvent. The organic solvent may be the same as the dope for the intermediate layer. As the preparation of the dope for the magnetic recording layer, the magnetic recording material is dispersed in a polymer solution by using a usual dispersion mixer such as a sand mill, and then, further mixed with the polymer solution.

As the method of forming the support by casting the above respective dopes, they may be cast simultaneously using a co-casting die, or may be cast successively using separate casting dies (including coating where the first cast dope is solidified completely, and then the next dope is cast). That is, the dope for the magnetic recording layer and the dope for the cellulose ester layer are cast, while the dope for the intermediate layer which contains a polymer having a different solubility in the solvent for separation from the cellulose ester of the cellulose ester layer is cast between these dopes. Alternatively, the dope for the cellulose ester layer, the dope for the intermediate layer which contains a polymer having a different solubility in the solvent for separation from the cellulose ester of the cellulose ester layer and the dope for the magnetic recording layer are cast successively in this order. Accordingly, the present invention can be applied to both of the whole surface laminating method and the stripe laminating method.

In the case of using a co-casting die, the die may be an inside concourse type die wherein respective layers meet on the inside of the die or an outer lip concourse type die wherein respective layers meet at the outer lip of the die. However, when the magnetic recording material has an anisotropic form such as needle particles, the inside concourse type co-casting die is more preferable because of improving squareness ratio by flow orientation of the magenetic recording material particles.

Besides, in order to cast these dopes stably through the inside concourse type co-casting die, it is preferable that the shearing viscosity of each dope at the shearing rate in flow casting is in the range of 1:50, and the range of 1:10 is particularly preferred, Taking the flow stability tn a die slit into consideration, the viscosity of the dope for the intermediate layer is preferably higher than the viscosity of the dope for the cellulose ester layer and the dope for the magnetic recording layer.

Although the support for photograpic photosensitive materials of the invention comprises the magnetic recording layer, the cellulose ester layer and the intermediate layer mentioned theretofore, it may be provided with other layers having various functions, if necessary. The additional layers include undercoating layer for improving the adhesiveness to photographic emulsion, antistatic layer for preventing electrification, lubrication layer for improving runability in a camera and protection layer for preventing the occurrence of abrasion. These various function layers may be co-cast with the magnetic recording layer simultaneously, or may be formed in a separate process.

The support for photographic photosensitive materials can be separated by immersing in the solvent for separation. The separated cellulose ester layer can be used as regenerated raw material by treating through a usual purification process. For the separation of the magnetic recording layer from the cellulose ester layer a known general method can be utilized, such as sedimentation or centrifugation utilizing the difference of specific gravity or magnetic separation utilizing magnetic properties.

The present invention provides another means which also has achieved the objects, wherein a dope for an intermediate layer having a smaller polymer/solvent ratio than the dope for the magnetic recording layer is used. In this case, the dope for the intermediate layer casts so as to contact the dope for the magnetic recording layer. The dope for the intermediate layer may be co-cast with the dope for the magnetic recording layer and the dope for the cellulose ester layer, or may be cast successively according to the lamination order. By this means, magnetic properties are improved.

In the means, the polymer/solvent ratio of the dope for the intermediate layer is rendered smaller than the dope for the magnetic recording layer. The polymer/solvent ratio of the dope for the intermediate layer is preferably less than 0.95 time of the polymer/solvent ratio of the magnetic recording layer, and less than 0.85 time is particularly preferred.

The other constructions are similar to previously mentioned.

In the invention, when the support for photographic photosensitive materials to immersed in the solvent for separation which dissolves the polymer of the intermediate layer rapidly without dissolving the cellulose ester layer, the solvent permeates the magnetic recording layer and reaches to dissolve the intermediate layer. Thereby, the magnetic recording layer separates from the cellulose ester layer. Accordingly, edge tram wastes and perforation wastes can easily be recycled as regenerated raw material.

Moreover, mass transfer occurs between the dope for the magnetic recording layer and the dope for the intermediate layer immediately after their contact. That is, the polymer diffuses from the dope for the magnetic recording layer having a high polymer concentration to the dope for the intermediate layer having a low polymer concentration, and conversely, the solvent diffuses from the dope for the intermediate layer to the dope for the magnetic recording layer. While, since the magnetic material dispersed in the dope for the magnetic recording layer is not transferred, the magnetic recording layer after drying becomes thinner than the mere cast magnetic recording layer to form the magnetic recording layer having a high magnetic recording material density. Since the magnetic recording material layer thus obtained has high magnetic record characteristics, the magnetic record characteristics per a unit quantity of the magnetic recording material are improved. According the amount of the magnetic recording material can be reduced substantially, and influences upon photographic properties can be inhibited.

EXAMPLES

An example of the support for photographic photosensitive materials of the invention is illustrated in FIG. 1. The support consists of the magnetic recording layer 10, the intermediate layer 20 and the cellulose ester layer 30. In the magnetic recording layer 10, magnetic recording material is uniformly dispersed in a polymer. The intermediate layer 20 is formed of a polymer of which the solubility in the solvent for separation is different from the cellulose ester of the cellulose ester layer. The cellulose ester layer 30 is formed of a cellulose ester.

Figure 2:
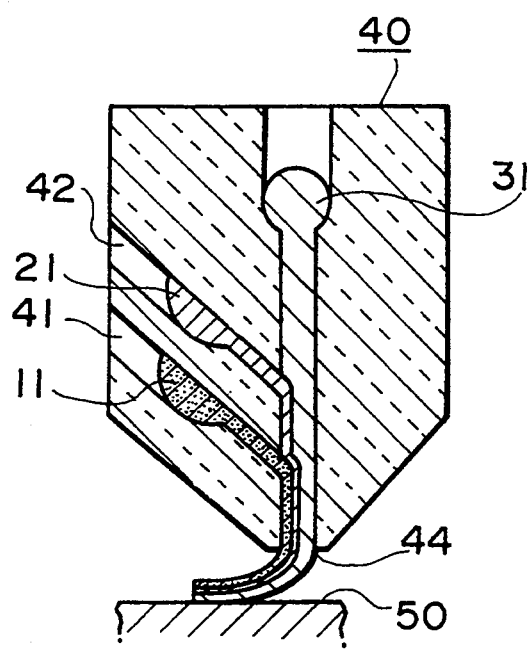
FIGS. 2 and 3 are sectional views of two co-casting dies used for producing the support of the invention.

A co-casting state in the production of the above support using a co-casting die 40 is shown in FIG. 2. First, a dope 11 for the magnetic recording layer 10, a dope 21 for the intermediate layer 20 which is composed of a polymer having a solubility in the solvent for separation different from the cellulose ester and having a polymer/solvent ratio smaller than the dope for the magnetic recording layer and a dope 31 for the cellulose ester layer 30 are prepared. Then, the dope 11 for the magnetic recording layer is charged in a first manifold 41 of a co-casting die 40, the dope 21 for the intermediate layer is charged in a second manifold 42, and the dope 31 for the cellulose ester layer is charged in a third manifold 43, respectively. These dopes are co-cast from a cast opening 44 onto a casting support 50. At that time, the dope 31 for the cellulose ester layer first meets the dope 21 for the intermediate layer, and then, the dope 21 for the intermediate layer meets the dope 11 for the magnetic recording layer. In the dope 21 for the intermediate layer and the dope 11 for the magnetic recording layer met with each other, the polymer diffuses from the dope 11 for the magnetic recording layer to the dope 21 for the intermediate layer, and the solvent diffuses from the dope 21 for the intermediate layer to the dope 11 for the magnetic recording layer. Accordingly, the rate of components of the dope 11 for the magnetic recording layer at the flow casting thereof is different from that at the preparation, and the rate of the magnetic material is increased.

Respective dopes 11, 21, 31 east on the casting support 50 are solidified to form the magnetic recording layer 10, the intermediate layer 20 and the cellulose ester layer 30 to complete the support for photographic photosensitive materials.

When the above support for photographic photosensitive materials is separated into the magnetic recording layer 10 and the cellulose ester layer 30, it is immersed in a solvent for separation which does not dissolve the cellulose ester but dissolve the polymer of the intermediate layer 20. Then, the organic solvent permeates into the magnetic recording layer 10, and reaches to dissolve the intermediate layer 20. Accordingly, the binding force of the intermediate layer 20 reduces, and the magnetic recording layer 10 is easily separated from the cellulose ester layer 30.

Figure 3:
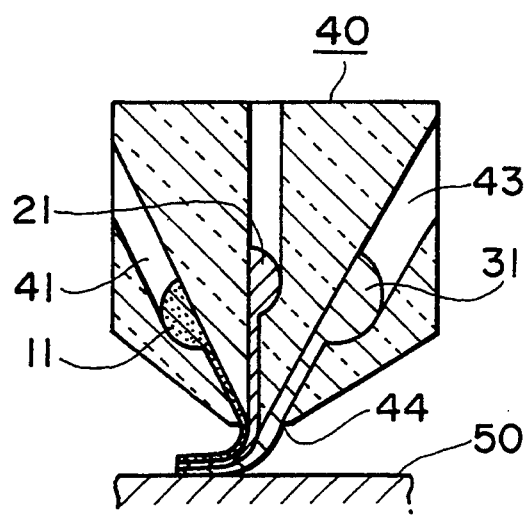

Another co-casting state in the production of the aforementioned support using a co-casting die is shown in FIG. 3. This die is an outer lip concourse type die, and respective of a first manifold 41, a second manifold 42 and a third manifold 43 are mat at the cast opening 44. The casting method is similar to the die of FIG. 2.

EXAMPLE 1

| Dope for the magnetic recording layer: | Table 1(a) |
| Dope for the intermediate layer: | Table 1(b) |
| Dope for the cellulose ester layer: | Table 1(c) |

Using the above dopes the following support for photographic photosensitive materials was produced by the inside concourse type co-casting die shown in FIG. 2. Support for photographic photosensitive materials:

As shown in FIG. 1, the support consisted of the magnetic recording layer 10, the intermediate layer 20 and the cellulose ester layer 30. The thickness of the magnetic recording layer 10 was 1 $\mu$m, that of the intermediate layer was 5 $\mu$m, and that of the cellulose ester layer was 109 $\mu$m.

EXAMPLE 2

| Dope for the magnetic recording layer: | Table 1(a) |
| Dope for the intermediate layer: | Table 1(d) |
| Dope for the cellulose ester layer: | Table 1(c) |

Using the above dopes, the support for photographic photosensitive materials having the same layer construction and the same thickness as Example 1 was produced by the same co-casting die as Example 1.

Conventional Example

Dopes were the same as Example 1 except that the dope for the intermediate layer was not used.

Figure 4:
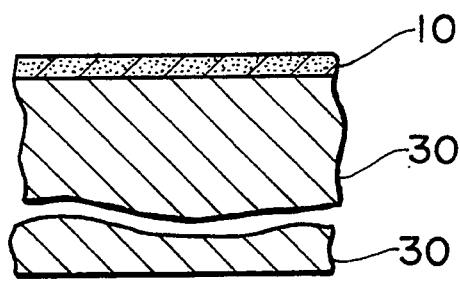
FIG. 4 is a partially sectional view of a conventional support for photographic photosensitive materials.

Using the above dopes, the following support for photographic photosensitive materials was produced by an inside concourse type co-casting die. Support for photographic photosensitive materials:

As shown in FIG. 4, the support consisted of two layers, i.e. the magnetic recording layer 10 and the cellulose ester layer 30. The thickness of the magnetic recording layer was 1 $\mu$m, and that of the cellulose ester layer was 114 $\mu$m.

TABLE 1

|  | (a) | (b) | (c) | (d) |
| --- | --- | --- | --- | --- |
| (Parts by Weight) | | | | |
| Cellulose Triacetate | 17 | 13 | 17 | 13 |
| Triphenyl phosphate | 3 | — | 3 | — |
| Co-γ Iron Oxide*1 | 1 | — | — | — |
| Methylene Chloride | 67 | 72 | 68 | 72 |
| Methanol | 9 | 10 | 9 | 10 |
| n-Butanol | 3 | 3 | 3 | 3 |
| Acetylation Degree (%) of Cellulose Acetate | 61 | 61 | 61 | 55 |
| Viscosity of Dope (Poise) | 250 | 260 | 240 | 260 |

*1 Co-coated ferric oxide (needles, specific surface area: 38 $m^2/g$, Hc = 800 Oe)

Test 1

Each of the above supports for photographic photosensitive materials was slit into 35 mm in width. In order to measure electromagnetic conversion characteristics, each sample was traveled at 30 mm/sec, and recording and reading of 1 kHz digital signals were conducted using a 4 channel audio head capable of inputting/outputting at a track width of 0.4 mm, and the SN ratio was measured. Each head had the same capacity, the head gap was 5 μm, and the number of turns was 1000.

Test 2

In order to evaluate the transparency of each of the above supports for photographic photosensitive materials, an optical density was measured using a Macbeth densito meter.

The results of Tests 1 and 2 are summarized In Table 2.

TABLE 2

|  | Test 1 | Test 2 | | |
| --- | --- | --- | --- | --- |
|  | SN Ratio | O.D.(R) | O.D.(G) | O.D.(B) |
| Example 1 | 30 dB | 0.05 | 0.10 | 0.15 |
| Conventional | 26 dB | 0.06 | 0.10 | 0.16 |
| Example 2 | 31 dB | 0.06 | 0.10 | 0.15 |

By the results of Test 1, it was confirmed that the SN ratios of the supports of Examples 1 and 2 were remarkably improved compared with that of Conventional Example not containing the intermediate layer. By the results of Test 2, it was confirmed that the supports of Examples 1 and 2 has a transparency similar to Conventional Example, and there is no problem in a practical viewpoint.

Test 3

A section of the support for photographic photosensitive materials of Example 1 and that of Conventional Example were observed by a scanning electron microscope by enlarging 10,000 times. As a result, the thickness of the magnetic recording layer of Example 1 was 0.9 μm, and that of Conventional Example was 1.0 μm. Accordingly, it was confirmed that the magnetic recording layer of Example 1 was densified.

Test 4

In order to evaluate separation ability, the support for photographic photosensitive materials of Example 2 was cut into square pieces 1 cm in side. The pieces were immersed in an acetone-methanol mixed solvent (weight ratio of 7:3), and stirred. As a result, the magneic recording layer was separated from the cellulose acetate layer after 20 seconds. Accordingly, it was confirmed that the support for photographic photosensitive materials of Example 2 was very convenient for recycling.

We claim:

1. A support for photographic photographic photosensitive materials which consists essentially of a magnetic recording layer, a cellulose ester layer and an intermediate layer provided between the magnetic recording layer and the cellulose ester layer consisting essentially of a polymer of which the solubility in a solvent is different from the cellulose ester of the cellulose ester layer, wherein said cellulose ester of the cellulose ester layer is cellulose acetate and said polymer of the intermediate layer is cellulose acetate, wherein said cellulose acetate of the intermediate layer has an acetylation degree lower than that of the cellulose ester layer.

2. The support of claim 1 wherein said solvent is a mixed solvent of acetone and methanol.

3. The support of claim 1 wherein said cellulose acetate of the cellulose ester layer has an acetylation degree of 56 to 62%.

4. A process for producing a support for photographic photosensitive materials consisting essentially of a magnetic recording layer, an intermediate layer and a cellulose ester layer laminated in this order which comprises casting a dope for the magnetic recording layer, a dope for the intermediate layer and a dope for the cellulose ester layer, said dope for the intermediate layer comprising a polymer of which the solubility in a solvent is different from the cellulose ester of the cellulose ester layer, wherein each dope is made from cellulose acetate, wherein said cellulose acetate of the intermediate layer has an acetylation degree lower than that of the cellulose ester layer.

5. The process of claim 4 wherein the three dopes are co-cast.

6. The process of claim 4 wherein the three dopes are cast successively.

7. The process of claim 4 wherein said solvent is a mixed solvent of acetone and methanol.

8. The process of claim 4 wherein the cellulose acetate content of said dope for the intermediate layer and said dope for the cellulose ester layer is 8 to 27 wt %.

9. The process for producing a support for photographic photosensitive materials consisting essentially of a magnetic recording layer, an intermediate layer and a cellulose ester layer laminated in this order which comprises casting a dope for the magnetic recording layer, a dope for the intermediate layer and a dope for the cellulose ester layer, said dope for the intermediate layer having a smaller polymer/solvent ratio than the dope for the magnetic recording layer, and said dope for the intermediate layer casting so as to contact the dope for the magnetic recording layer, wherein each dope is made from cellulose acetate.

10. The process of claim 9 wherein the three dopes are co-cast.

11. The process of claim 9 wherein the three dopes are cast successively.

12. The process of claim 9 wherein the cellulose acetate content of said dope for the intermediate layer and said dope for the cellulose ester layer is 8 to 27 wt %.

13. The process of claim 9 wherein the polymer/solvent ratio of the dope for the intermediate layer is less than 0.85 times the polymer/solvent ratio of the magnetic recording layer.

14. A process for producing a support for photographic photosensitive materials consisting essentially of a magnetic recording layer, an intermediate layer and a cellulose ester layer laminated in this order which comprises casting a dope for the magnetic recording layer, a dope for the intermediate layer and a dope for the cellulose ester layer, said dope for the intermediate layer comprising a polymer of which the solubility in a solvent is different from the cellulose ester of the cellulose ester layer, said dope for the intermediate layer having a smaller polymer/solvent ratio than the dope for the magnetic recording layer, and said dope for the intermediate layer casting so as to contact the dope for the magnetic recording layer, wherein each dope is made from cellulose acetate, wherein said cellulose acetate of the intermediate layer has an acetylation degree lower than that of the cellulose ester layer.

15. The process of claim 14 wherein the polymer/solvent ratio of the dope for the intermediate layer is less than 0.85 times the polymer/solvent ratio of the magnetic recording layer.

* * * * *